(12) United States Patent
Gosis et al.

(10) Patent No.: US 8,016,325 B2
(45) Date of Patent: Sep. 13, 2011

(54) SELF-POSITIONING ADAPTING SYSTEM BETWEEN AIRCRAFT AND PRECONDITIONED-AIR SUPPLY HOSE

(75) Inventors: Anatoly Gosis, Palatine, IL (US); Scott Takayuki Koizumi, Fairfield, CA (US); Folkert Fred Koch, San Ramon, CA (US); Brian Michael Piety, Vacaville, CA (US); Mark David Resendes, Dixon, CA (US); Dale Arnold Miller, Vacaville, CA (US)

(73) Assignee: Hobart Brothers Company, Troy, OH (US)

( * ) Notice: Subject to any disclaimer, the term of this patent is extended or adjusted under 35 U.S.C. 154(b) by 652 days.

(21) Appl. No.: 11/753,382

(22) Filed: May 24, 2007

(65) Prior Publication Data
US 2008/0054631 A1 Mar. 6, 2008

Related U.S. Application Data

(60) Provisional application No. 60/841,057, filed on Aug. 30, 2006.

(51) Int. Cl.
*F16L 27/00* (2006.01)
(52) U.S. Cl. ...... 285/236; 285/280; 285/261; 285/147.1
(58) Field of Classification Search .................. 285/235, 285/236, 224, 280, 281, 261, 226, 147.1, 285/147.2, 148.15, 148.3, 146.1, 145.3; 141/384
See application file for complete search history.

(56) References Cited

U.S. PATENT DOCUMENTS

| | | | | |
|---|---|---|---|---|
| 2,613,087 A | * | 10/1952 | Alford | 285/261 |
| 2,616,728 A | * | 11/1952 | Pitt | 285/47 |
| 2,793,883 A | * | 5/1957 | Main, Jr. | 285/229 |
| 3,126,992 A | * | 3/1964 | McCullough | 193/16 |
| 3,173,710 A | | 3/1965 | Kinnison | |
| 3,399,545 A | * | 9/1968 | Anderson et al. | 285/302 |
| 3,521,316 A | * | 7/1970 | Adams et al. | 138/155 |
| 3,834,741 A | * | 9/1974 | Drake | 285/226 |
| 3,873,137 A | * | 3/1975 | Yamaguchi | 285/226 |

(Continued)

FOREIGN PATENT DOCUMENTS
CH 378114 A 5/1964
(Continued)

OTHER PUBLICATIONS
PCT Search Report.

*Primary Examiner* — David E Bochna
(74) *Attorney, Agent, or Firm* — Quarles & Brady LLP

(57) ABSTRACT

A system and method for connecting a traditional air chute to an air hose delivering preconditioned air to an aircraft includes an adapter system. The adapter system includes a flexible stage having an exterior surrounding a hollow interior configured to receive air from the air hose and deliver the air to the air chute. The adapter system also includes a rotational stage coupled to the flexible stage and having an exterior surrounding a hollow interior configured to receive air from the air hose and deliver the air to the air chute. The flexible stage is adjustable relative to the rotational stage to selectively move the hollow interior of the flexible stage between extending along a common axis through the air chute and the rotational stage and not extending along the common axis.

20 Claims, 7 Drawing Sheets

U.S. PATENT DOCUMENTS

| | | | |
|---|---|---|---|
| 4,151,612 A * | 5/1979 | Vykukal | 2/2.13 |
| 4,357,860 A * | 11/1982 | Krzak | 285/302 |
| RE31,562 E * | 4/1984 | Bede | |
| 4,498,247 A * | 2/1985 | Benevento | |
| 4,543,677 A * | 10/1985 | Haglund et al. | 285/302 |
| 4,572,550 A * | 2/1986 | Harder | 285/47 |
| 4,578,855 A * | 4/1986 | Van Der Hagen | 29/447 |
| 4,953,897 A * | 9/1990 | Klober | 285/226 |
| 5,121,948 A * | 6/1992 | Anderson et al. | 285/147.1 |
| 5,133,579 A * | 7/1992 | Anderson et al. | 285/226 |
| 5,355,917 A * | 10/1994 | Kofflin | 141/384 |
| 5,720,656 A * | 2/1998 | Savage | 454/119 |
| 6,182,721 B1 * | 2/2001 | Gregoryk | 141/384 |
| 6,185,837 B1 * | 2/2001 | Tuggle | |
| 6,289,949 B1 * | 9/2001 | Shumaker et al. | 141/384 |
| 6,370,794 B1 * | 4/2002 | Tuggle | 285/147.1 |
| 6,508,492 B2 * | 1/2003 | Nixon et al. | 285/281 |
| 6,709,023 B2 * | 3/2004 | French | 285/223 |
| 6,860,519 B2 * | 3/2005 | Berengut et al. | 285/226 |

FOREIGN PATENT DOCUMENTS

| | | |
|---|---|---|
| DE | 29717697 U1 | 11/1997 |
| EP | 1338839 A | 8/2003 |
| FR | 2504645 A | 10/1982 |
| FR | 2607684 A | 6/1988 |
| WO | 2004/000646 A | 12/2003 |

* cited by examiner

SELF-POSITIONING ADAPTING SYSTEM BETWEEN AIRCRAFT AND PRECONDITIONED-AIR SUPPLY HOSE

REFERENCE TO RELATED APPLICATIONS

The present application is based on U.S. Provisional Patent Application Ser. No. 60/841,057, entitled "Pre-Conditioned Air Hose Adapters and Joints," filed Aug. 30, 2006, and claims the benefit thereof.

STATEMENT REGARDING FEDERALLY SPONSORED RESEARCH OR DEVELOPMENT

Not applicable.

BACKGROUND OF THE INVENTION

The present invention relates generally to a system and method for connecting a source of preconditioned air to a receiver for the preconditioned air, typically an aircraft. More particularly, the present invention relates to a self-aligning system and method for connecting a hose leading from the source of preconditioned air to an aircraft to reduce the potential for placing undue stress on the connection to the aircraft, the hose leading to the aircraft, or the individual creating the connection to the aircraft.

Referring to FIG. 1, when an aircraft 10 is at rest on the ground 12, the aircraft 10 is often connected to a source of preconditioned air 14. That is, rather than tax the onboard heating or air-conditioning systems of the aircraft 10, a connection is made to a ground source 14 that provides heated or air-conditioned air to the aircraft 10. To facilitate such a connection, a hose 16 is extended from the preconditioned-air ground source 14 to a standardized hatch door 18 located, generally, on the underside of the aircraft 10. To create a secure connection between the hose 16 and the aircraft 10, a standard air chute 20 is typically used that mates and locks with the area about the hatch door 18 through a clamping or similar fixed connection system.

While the hose 16 connecting the preconditioned-air ground source 14 and the aircraft 10 is generally designed to be at least somewhat flexible, the hose 16 may not be able to be arranged in a desired position. As a result, the hose 16 may be unduly stressed during and/or after the connection process. The hose 16 and air chute 20 are joined through a fixed or rigid connection and the hose is often required to twist and turn to arrange the air chute 20 in the proper position to mate with the area around the hatch door 18 of the aircraft 10. In this regard, the hose 16 may not be able to be positioned as desired and can become kinked and stressed. In some instances, the hose 16 must make multiple turns at various elevations leading from the ground 12 to the underside of the aircraft 10. To further compound matters, the hose 16 leading from the preconditioned-air ground source 14 is typically of a larger diameter, for example, 14 inches, than the hatch door opening 18, for example, 8 inches. In this case, a tapered section 22 may be included that extends between the two differing diameters. However, these tapered sections 22 create additional connection points that must be accommodated when making connections between the hose 16 and aircraft 10.

Due to the combination of these fixed elements and the requirements of making connections to an aircraft, airflow from the ground source 14 to the aircraft 10 can be degraded and an insufficient supply of air delivered to the aircraft 10. As such, operators are frequently required to spend a significant amount of time and effort making connections and ensuring that kinks are avoided. In some cases, an operator must revisit poor connections. Even with the best efforts of operators, over time, these stresses and kinks can degrade the lifespan of the equipment used to provide preconditioned air to an aircraft 10.

Some systems have been developed that attempt to alleviate these problems by providing a fixed elbow and/or rotary mechanism that allows the fixed elbow to face a desired direction. However, these systems often fail to meet regulatory standards and/or employ proprietary parts and connecting mechanisms. Therefore, to utilize these systems, standardized air chutes must be abandoned in favor of the proprietary elbow/rotary system. Furthermore, such systems often fail to rotate freely when subjected to the significant load presented by connecting the hose, elbow, and rotation mechanism to the aircraft. That is, when not under load (i.e., disconnected from the aircraft), the elbow can be rotated about the rotation mechanism to face in a desired direction. However, once loaded through a connection to an aircraft, the stress placed on the fixed elbow and rotation mechanism causes the elbow to be fixed in one direction unless an operator intervenes to reduce the stress presented by the load and manually rotate the elbow. Accordingly, in many cases, without significant operator intervention, such fixed elbow/rotational systems can present more stress on the hose and various connection points than traditional connection systems.

Therefore, it would be desirable to have a system and method for allowing a hose leading from the source of preconditioned air to an aircraft to self align.

BRIEF SUMMARY OF THE INVENTION

The present invention overcomes the aforementioned drawbacks by providing an adapter system configured to allow an air-supply hose leading from an air source to an aircraft to self align. Furthermore, the present invention is configured to integrate with a traditional PC air hose and air chute.

In accordance with one aspect of the present invention, an adapter system is disclosed that is configured to extend between an air hose and an air chute configured to connect the air hose to an aircraft to deliver air from a remote air source. The adapter system includes a flexible stage having an exterior surrounding a hollow interior configured to receive air from the air hose and deliver the air to the air chute. The adapter system also includes a rotational stage coupled to the flexible stage and having an exterior surrounding a hollow interior configured to receive air from the air hose and deliver the air to the air chute. The flexible stage is adjustable relative to the rotational stage to selectively move the hollow interior of the flexible stage between extending along a common axis through the air chute and the rotational stage and not extending along the common axis.

In accordance with another aspect of the present invention, an adapter is disclosed for coupling an air chute having a hollow interior extending along a first axis to an air hose extending along a second axis to deliver preconditioned (PC) air from a preconditioned-air source to an aircraft. The adapter includes a coupling connected to the air chute and having a hollow interior extending coaxially with the hollow interior of the air chute along the first axis. The adapter also includes a flexible fitting having a hollow interior and an adjustable exterior configured to flex and cause the first axis of the air chute and the second axis of the air hose to extend non-coaxially. Furthermore, the adapter includes a rotational coupling having a hollow interior extending coaxially with one of the first axis of the air chute and the second axis of the air hose and an exterior configured to permit rotation of one of the air hose and the air chute with respect to the other of the air hose and the air chute.

In accordance with yet another aspect of the present invention, an adapter system is disclosed that is configured to extend between an air hose and an air chute designed to connect the air hose to an aircraft to deliver air from a remote air source. The adapter system includes a first stage having a hollow interior configured to receive air from the air hose and an exterior configured to engage the air chute and arrange the hollow interior of the first stage to extend along a common axis with a hollow interior of the air chute. The adapter system also includes a second stage engaged with the first stage and having an exterior surrounding a hollow interior configured to receive air from the air hose and deliver the air to the first stage. A first rotational coupling is included to join the first stage and the second stage. The adapter system further includes a third stage having an exterior surrounding a hollow interior configured to receive air from the air hose and deliver the air to the second stage and a second rotational coupling joining the second stage and the third stage.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
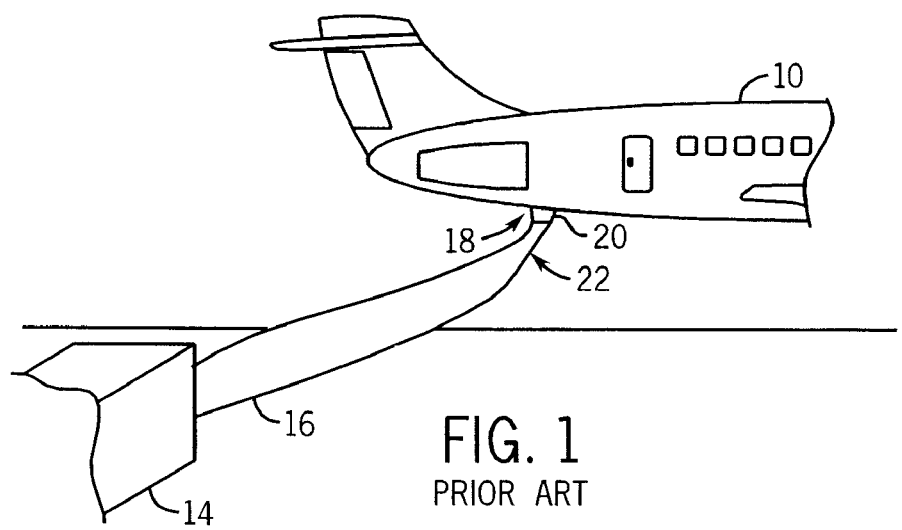
FIG. 1 is a side-elevational view of an aircraft receiving preconditioned air through a traditional air hose, rigid tapered adapter, and air chute coupling.
Figure 2:
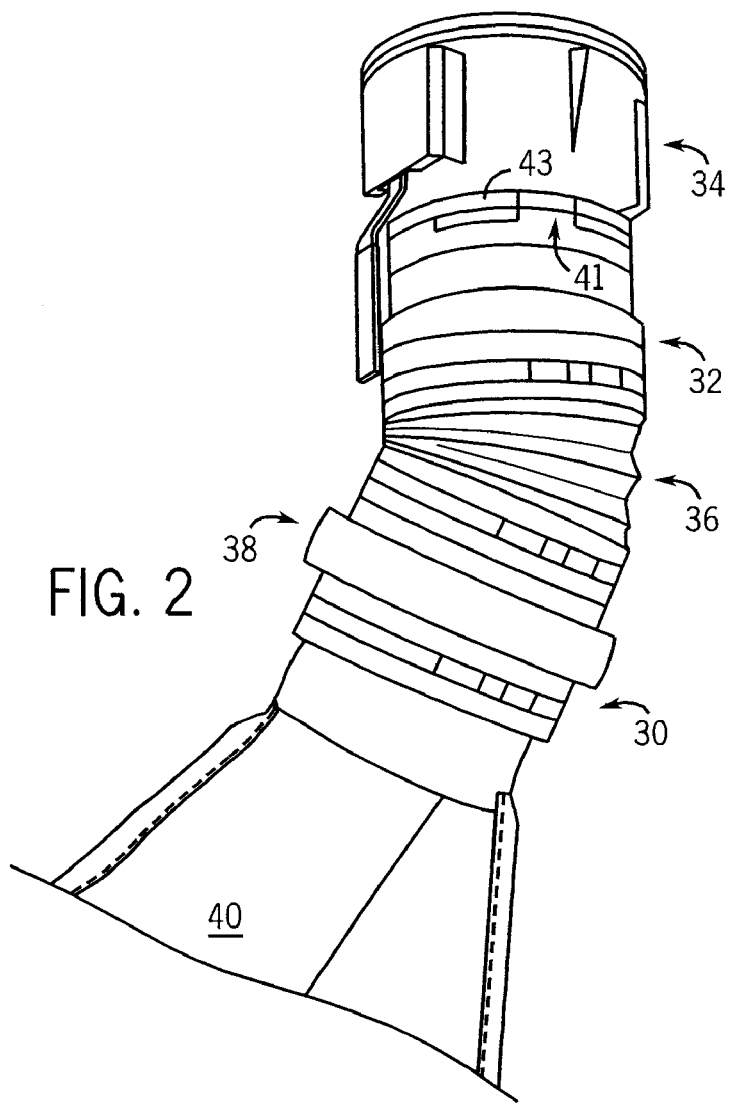
FIG. 2 is a side-elevational view of an adapter system in accordance with the present invention for connecting the traditional air chute and tapered adapter of FIG. 1.
Figure 3:
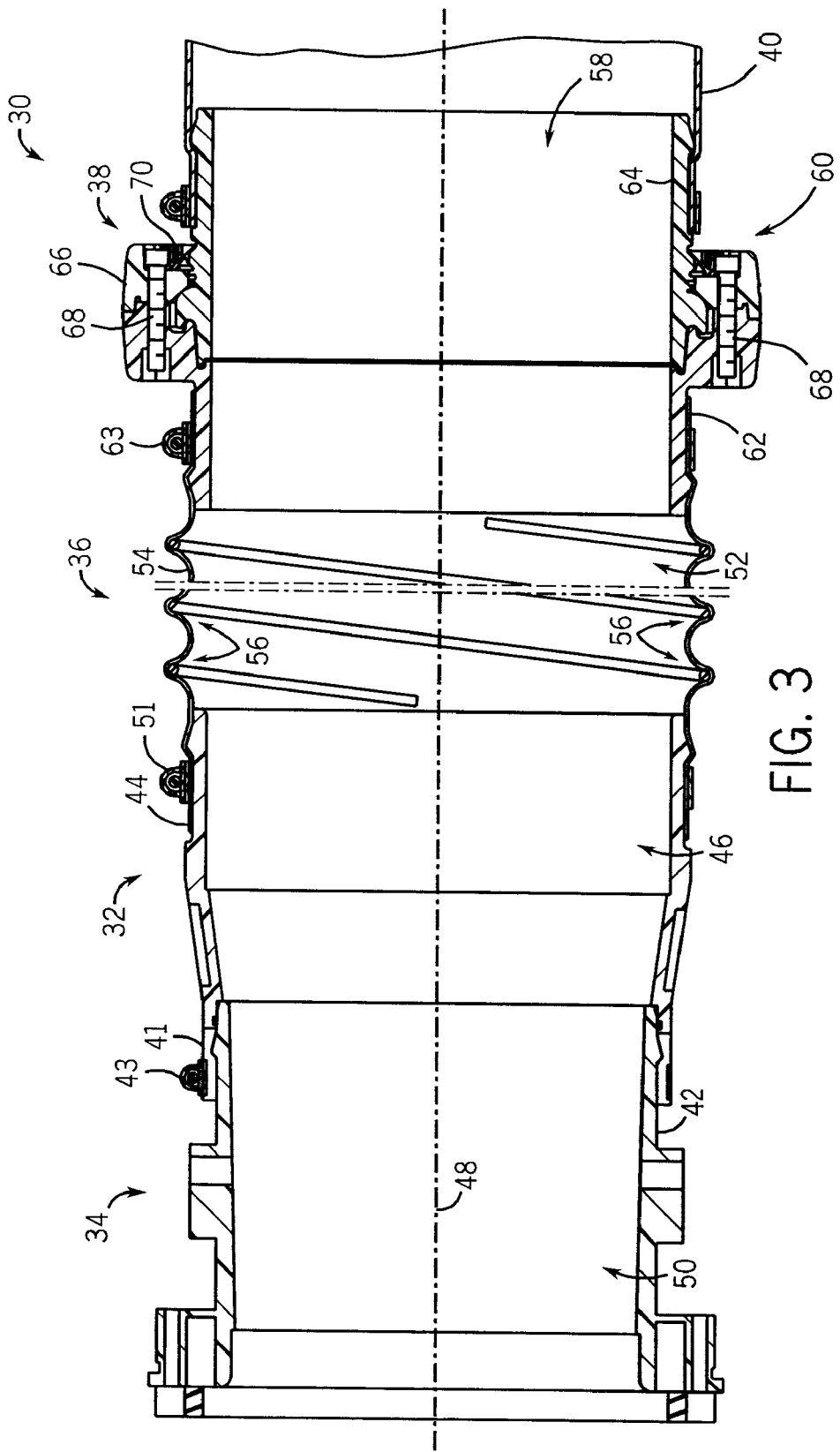
FIG. 3 is a cross-sectional view of the adapter system of FIG. 2.
Figure 4:
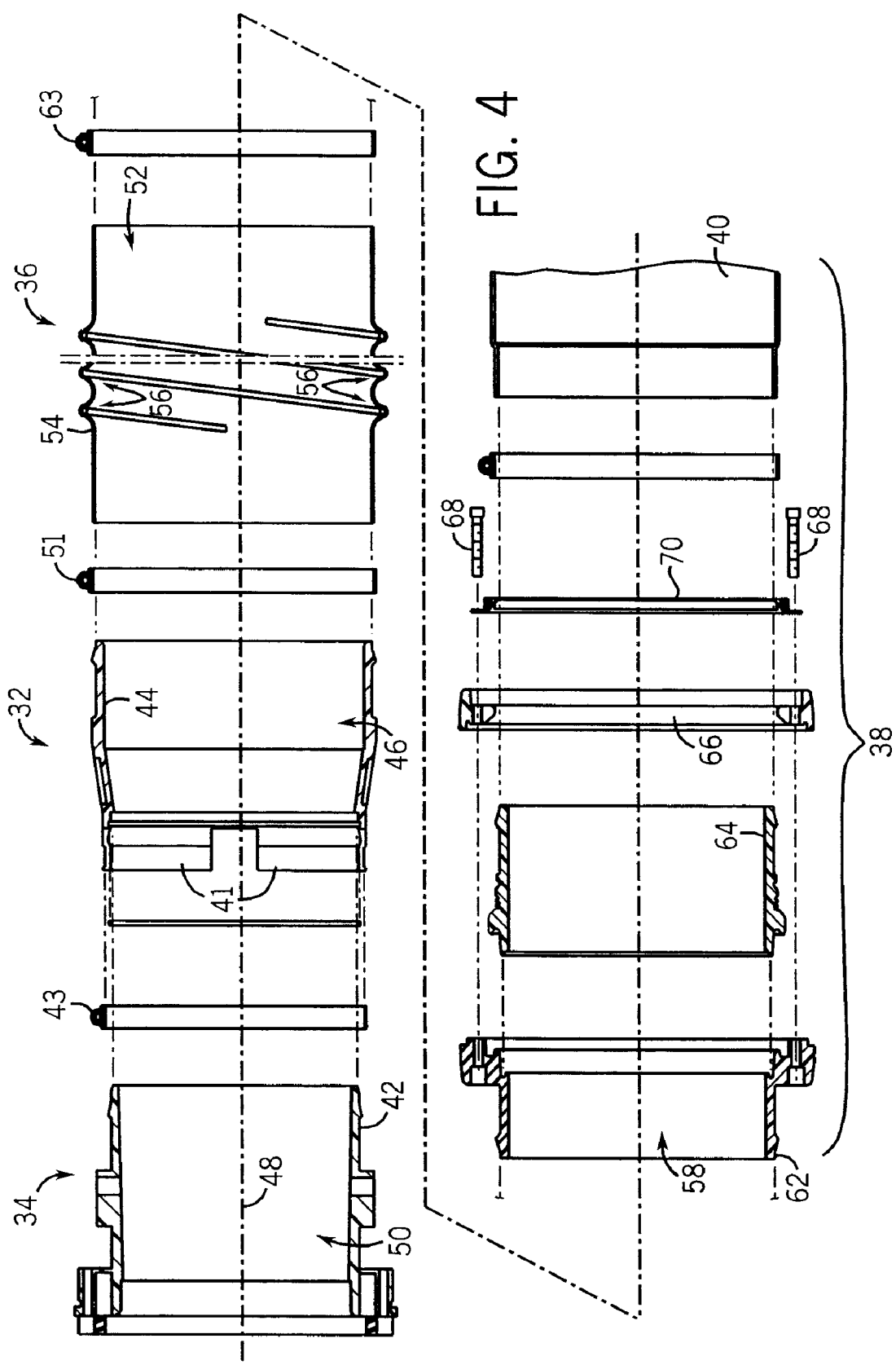
FIG. 4 is an exploded view of the adapter system of FIGS. 2-3.

Referring now to FIGS. 2-4, an adapter system 30 for a preconditioned (PC) air hose includes a plurality of stages. In particular, the illustrated configuration of the adapter system 30 includes a first stage 32 that is configured to engage a traditional air chute 34. The adapter system 30 also includes a second, flexible, stage 36 connected to the first stage 32 and a third, rotatable, stage 38 connected to the second stage 36. The third stage 38 is configured to engage a PC air hose, such as the air hose 16 described with respect to FIG. 1. However, as illustrated in FIG. 2, the third stage 38 is also configured to engage a tapered adapter 40 that connects a PC air hose, which generally has a 14 inch diameter, to the air chute 34, which generally has an 8 inch diameter.

In the illustrated configuration, the first stage 32 includes a crown 41 that extends over a portion of the air chute 34. As will be described, it is contemplated that in some arrangements the first stage 32 may be coupled to the air chute 34 by extending within the air chute 34. Additionally, it is contemplated that the first stage 32 may be configured to engage a PC air hose or tapered adapter and the third stage 38 configured to engage a traditional air chute 34. In the illustrated configuration, the first stage 32 of the adapter 30 extends over the air chute 34 and is secured thereto through the crown 41. In particular, the air chute 34 includes a mounting flange 42 that is designed to be engaged by an air hose, such as described with respect to FIG. 1. The crown 41 of the first stage 32 is designed to be secured to the air chute 34 through a compression coupling 43 that causes the crown 41 to engage the mounting flange 42 of the air chute 34. Thus, the first stage 32 of the adapter 30 is configured to mate with and be coupled to a traditional air chute 34. As such, proprietary air chutes or other coupling systems can be avoided.

The first stage 32 also includes a rigid exterior 44 that extends away from the crown 41 to form a hollow interior 46. In this regard, the hollow interior 46 of the first stage 32 extends along a common axis 48 with a hollow interior 50 of the air chute 34. By arranging the hollow interior 46 of the first stage 32 coaxially with the hollow interior 50 of the air chute 34, the flow of PC air through the first stage 32 and air chute 34 is facilitated.

The second stage 36 is secured to and extends away from the first stage 32. As illustrated, it is contemplated that the second stage 36 may extend partially over the first stage 32 and be secured thereon, for example, by way of a compression fitting 51, however, other fasting systems, such as a screw or rivet are contemplated. Furthermore, as will be described with respect to FIGS. 7 and 8, the second stage 36 may extend into the first stage 32 or may be integrated with the first stage 32.

In the configuration illustrated in FIGS. 1-3, the second stage 36 includes a hollow interior 52 surrounded by a flexible exterior 54. In this regard, the flexible exterior 54 is designed to allow the second stage 36 to move relative to the first stage 32 to thereby reposition the hollow interior 52. Therefore, the hollow interior 52 of the second stage 36 may be moved to extend coaxially or not coaxially with the common axis 48 of the air chute 34 and first stage 32. Thus, the second stage 36 forms a flexible fitting that is configured to be continuously adjustable in a plurality of directions away from the common axis 48.

The flexible fitting may be highly flexible or may include a partially rigid exterior 54. For example, the second stage 36 may be at least partially formed from cloth, nylon, rubber, plastic, or a similar flexible or semi-flexible material. Furthermore, the exterior 54 of the second stage 36 may be reinforced by, for example, a plurality of rigid ribs 56. The ribs 56 may be formed by a spiraled or "spring-shaped" rigid material. Accordingly, the second stage 36 may be biased to extend coaxially with the air chute 34 and first stage 32 and deviate therefrom when subjected to a sufficient opposing force.

The third stage 38 is formed from a plurality of parts that, together, define a hollow interior 58 and a rigid exterior 60. Specifically, the third stage 38 includes a first portion 62 configured to engage the second stage 36, for example, by way of another compression fitting 63, however, other fastening systems, such as screws or rivets are contemplated. The third stage 38 also includes a second portion 64 configured to extend from the first portion 62 to engage a traditional PC air hose or, as shown in FIG. 2, a tapered adapter 40. The first portion 62 and the second portion 64 are not fixed with respect to each other. Rather, a coupling ring 66 is included that is designed to extend over the second portion 64 to mate with and be secured to the first portion 62 through a plurality of screws 68 or other fastening devices. In this regard, the second portion 64 is secured to the first portion 62 by the coupling ring 66 but is free to rotate, for example, in 360 degrees. Therefore, the third stage 38 forms a rotary member that permits rotation of an attached PC air hose with respect to the air chute 34.

A seal 70 may be included to stop PC air flowing through the hollow interior 58 from escaping through the coupling formed between the first portion 62, second portion 64, and coupling ring 66. Additionally, it is contemplated that the third stage 38 may be arranged in an inverted orientation where the second portion 64 is engaged with the second stage 36 and the first portion 62 is engaged with the PC air hose or tapered adapter 40 of FIG. 2.

In either case, the hollow interior 58 of the third stage 38 may extend coaxially with the common axis 48 extending through the air chute 34 and the first stage 32 when the hollow interior 52 of the second stage 36 is aligned with the common axis 48. However, when the second stage 36 is moved or flexed, such that the hollow interior 52 of the second stage 36 does not extend coaxially with the common axis 48 extending through the air chute 34 and the first stage 32, the hollow interior 58 of the third stage 38 is also moved to not extend coaxially with the common axis 48.

The combination of the flexible motion facilitated by the second stage 36 and the rotational motion facilitated by the third stage 38 enables six degrees of freedom. Specifically, the flexible second stage 36 permits heaving, swaying, and surging motion. When combined with the rotatable third stage 38, pitching, yawing, and rolling motion are achieved.

Though the second stage 36 has been described as being discrete from the first stage 32 and the third stage 38 and secured thereto through a compression fitting, screw, rivet, or other fastening system, it is contemplated that the stages may be integrated or some stages may be omitted. For example, the second stage 36 may be co-molded with the first stage 32 and/or first portion 62 of the third stage 38. Similarly, as stated above, it is contemplated that the adapter system 30 may be arranged in an inverted arrangement, such that the third stage 38 includes the crown 41 designed to engage a traditional air chute 34 and the first stage 32 is configured to engage an air hose or tapered adapter 40. Furthermore, additional motion components may be included to provide varying degrees of freedom.

Figure 5:
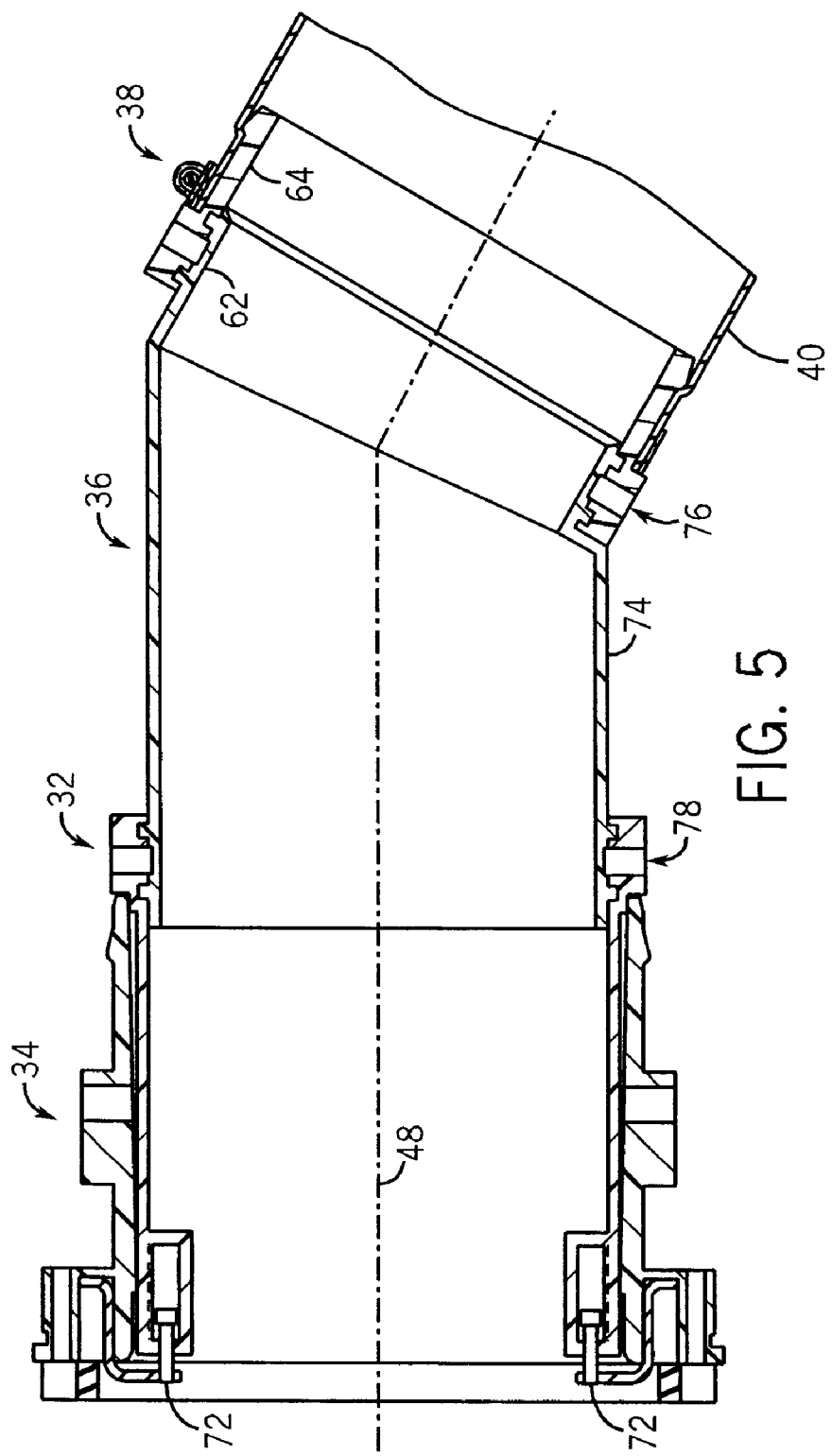
FIG. 5 is a cross-sectional view of another adapter system in accordance with the present invention for connecting the traditional air chute and tapered adapter of FIG. 1.

For example, referring now to FIG. 5, another configuration of the adapter system 30 is shown. In this arrangement, the first stage 32 is configured to extend within the air chute 34 and be fastened therewith through a screw, rivet, or other fastening device 72. In the illustrated arrangement, the second stage 36 no longer includes a flexible exterior. Rather, a rigid, angled exterior 74 is provided. In a manner similar to that described with respect to FIGS. 2-4, the second stage 36 is coupled to the third stage 38 through a rotational coupling 76. However, in this case, the second stage 36 is illustrated as being integrated with the first portion 62 of the third stage 38. Beyond the rotational coupling 76 created between the coupling of the second stage 36 and the third stage 38, a rotational coupling 78 is provided between the first stage 32 and the second stage 36. The combination of the rotational couplings 76, 78 and rigid, angled exterior 74 of the second stage 36 allows the adapter system 30 to rotate at multiple positions to self align. In this case, a PC air hose will be readily positioned in a desired positioned, for example, in a position that alleviates strains and stresses applied to a PC air hose when connected to an aircraft, as described above with respect to FIG. 1. For example, even if the rotational coupling 76 created between the coupling of the second stage 36 and the third stage 38 were to become stressed to an extent capable of impeding rotation of the rotational coupling 76, the rotational coupling 78 provided between the first stage 32 and the second stage 36 will rotate to reposition the second stage 36 and third stage 38 and alleviate the stress due to the fact that the first stage 32 and the second stage 36 are aligned along the common axis 48.

Figure 6:
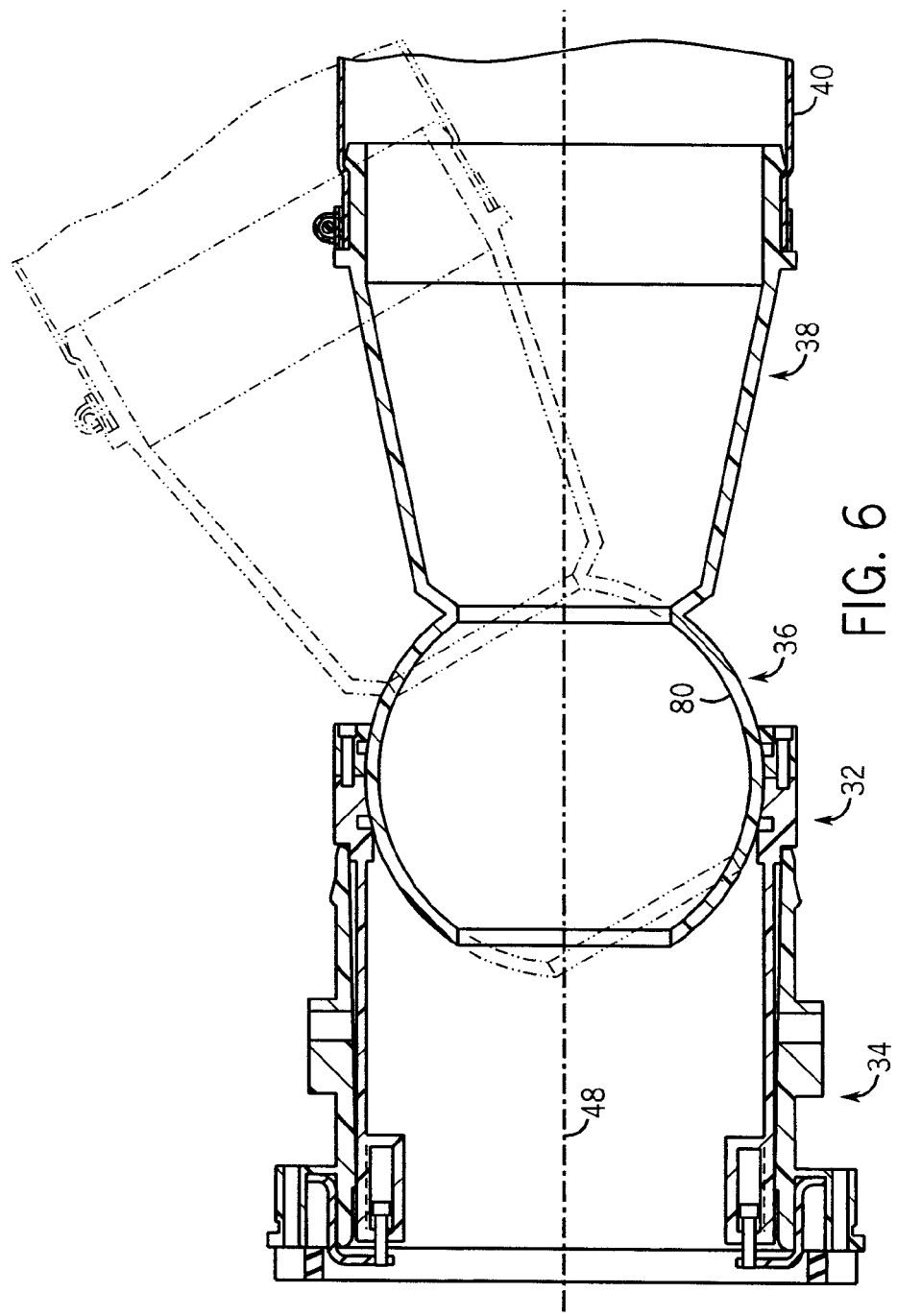
FIG. 6 is a cross-sectional view of yet another adapter system in accordance with the present invention for connecting the traditional air chute and tapered adapter of FIG. 1.

Referring now to FIG. 6, another configuration of the adapter system 30 is shown. In this case, it is further contemplated that the second stage and third stage described above with respect to FIGS. 2-5 may be permanently coupled. In the illustrated configuration, the first stage 32 is again configured to extend within and be removably affixed to the air chute 34. However, it is contemplated that the first stage 32 may also be configured to extend over the air chute 34. The second stage 36 has a substantially spherical exterior 80 extending into the first stage 32. However, it is likewise contemplated that the substantially spherical exterior may extend from the first stage 32 into the second stage 36. In either case, the first stage 32 and the second stage 36 form a ball-and-socket joint that allows the second stage 36 and third stage 38 to move relative to the first stage 32 and air chute 34 to extend along the common axis 48 or away from the common axis 48. As described above, the third stage 38 is fixedly coupled to the second stage 36. However, it is contemplated that the third stage 38 may be removably coupled with or engaged through a rotational coupling to the second stage 36. In either case, the ball-and-socket configuration of the adapter system provides three degrees of motion, including pitch, yaw, and roll.

Figure 7:
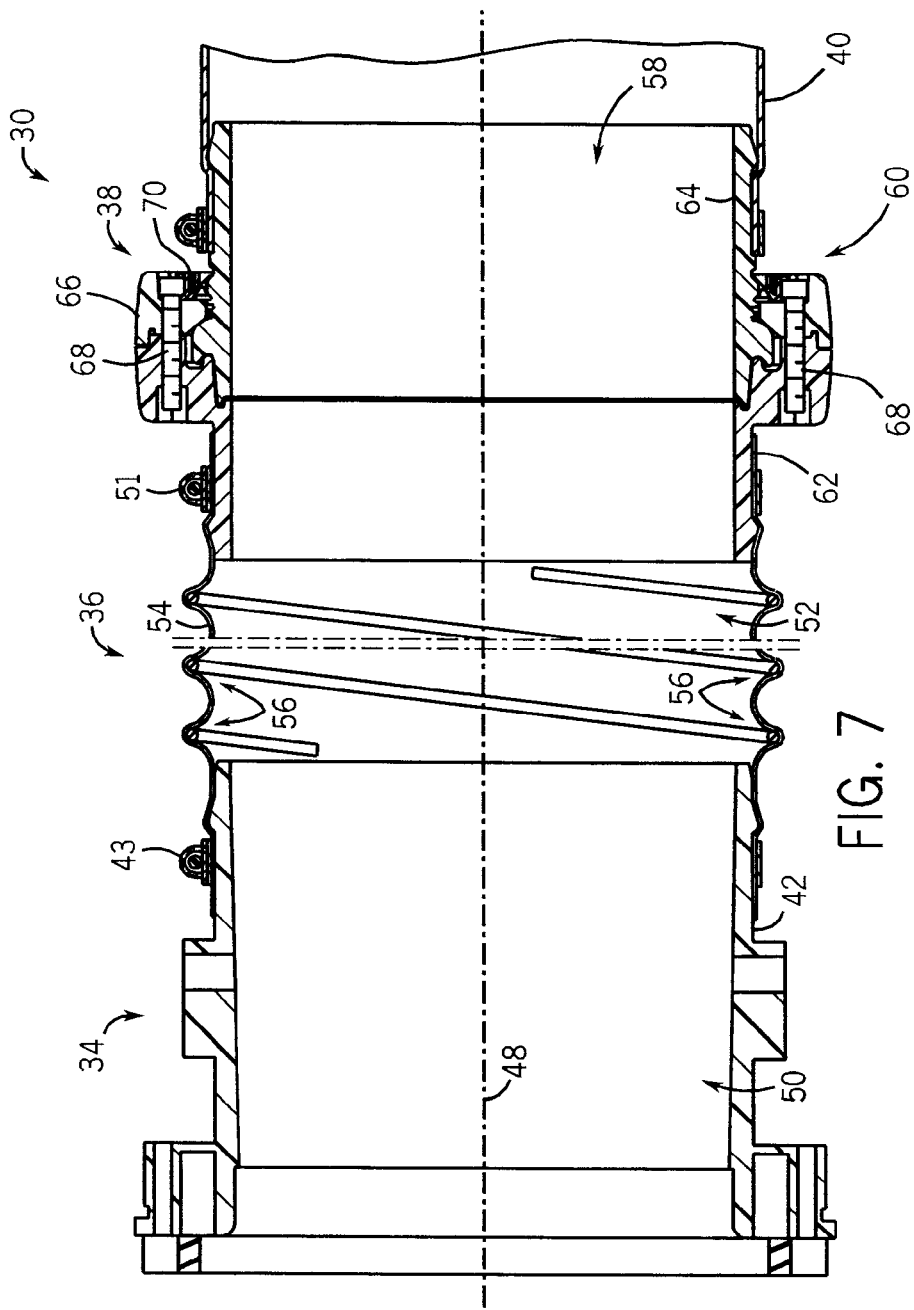
FIG. 7 is a cross-sectional view of still another adapter system in accordance with the present invention for connecting the traditional air chute and tapered adapter of FIG. 1.

Referring now to FIG. 7, it is contemplated that the first portion 32 described above may be removed or omitted. In this case, the second stage 36 may be configured to extend over the air chute 34 and be secured thereto by the compression fitting 43. This arrangement allows for a potential cost savings by the removal of the first stage 32, however, it is noted that the second stage 36 may need to be elongated over the above-described configurations in order to provide adequate displacement between the air chute 34 and the third stage 38 so as not to be impeded from flexing by handles extending from the air chute 34.

Figure 8:
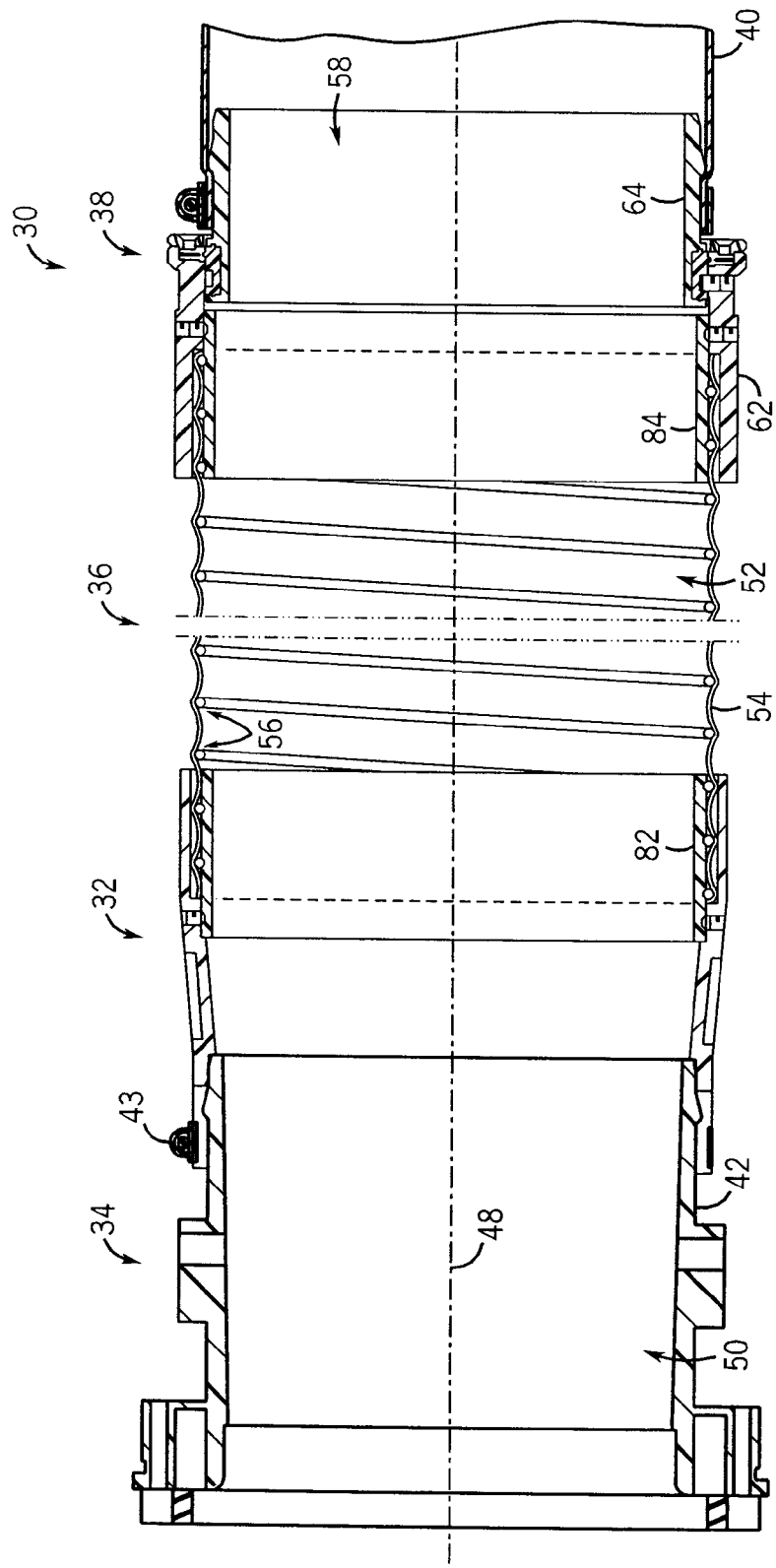
FIG. 8 is a cross-sectional view of a further adapter system in accordance with the present invention for connecting the traditional air chute and tapered adapter of FIG. 1.

Furthermore referring now to FIG. 8, it is contemplated that the second stage 36 may be configured to extend into the first stage 32 and third stage 38. In this case, biasing rings 82, 84 may be arranged within the first stage 32 and the third stage 38, respectively. The biasing rings 82, 84 are designed to secure the second stage 36 against an interior wall of the first stage 32 and the third stage 38. In this case, the ribs 56 formed by the biasing member within the second stage 36 is used to screw the second stage 36 into the first stage 32 and third stage 38.

Therefore, the above-described system and method facilitates self-alignment of a PC air hose. The above-described system is designed to integrate with a traditional PC air hose and air chute.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A system configured to deliver air to an aircraft comprising:
a remote air source configured to provide air;
a flexible air hose configured to receive air from the remote air source;
an air chute configured to connect to the aircraft and deliver air to the aircraft;
an adapter connected to the air hose and the air chute, the adapter including:
a flexible stage having an exterior surrounding a hollow interior configured to receive air from the air hose and deliver the air to the air chute;
a rotational stage coupled to the flexible stage and having an exterior surrounding a hollow interior configured to receive air from the air hose and deliver the air to tie air chute; and
wherein the flexible stage is adjustable relative to the rotational stage to selectively move the hollow interior of the flexible stage between extending along a common axis through the air chute and the rotational stage and not extending along the common axis.

2. The system of claim 1 wherein the flexible stage includes a flexible exterior configured to move relative to the air chute to selectively arrange the hollow interior of the flexible stage to extend along the common axis and not along the common axis.

3. The system of claim 2 wherein the flexible exterior is configured to be continuously flexible in a plurality of directions away from common axis.

4. The system of claim 3 wherein the flexible exterior includes at least one of cloth, nylon, plastic, and rubber.

5. The system of claim 1 further comprising a rigid material extending through the flexible stage and configured to bias the hollow interior along the common axis.

6. The system of claim 1 wherein the rotational stage is coupled to the flexible stage through a rotational coupling configured to permit the air hose to rotation with respect to the air chute.

7. The system of claim 6 wherein the rotational coupling includes a ball-and-socket joint.

8. The system of claim 1 wherein the flexible stage is configured to be continuously flexible in a plurality of directions away from the common axis.

9. The system of claim 1, wherein the flexible air hose has a first diameter, the air chute has a second diameter, and a ratio of the first diameter to the second diameter is substantially 7:4.

10. A system configured to deliver air to an aircraft comprising:
a remote air source configured to provide air;
a flexible air hose configured to receive air from the remote air source;
an air chute configured to connect to the aircraft and deliver air to the aircraft;
an adapter connected to the air hose and the air chute, the adapter including:
a flexible stage having an exterior surrounding a hollow interior configured to receive air from the air hose and deliver the air to the air chute;
a rotational stage coupled to the flexible stage and having an exterior surrounding a hollow interior configured to receive air from the air hose and deliver the air to the air chute;
an adapter stage including a crown configured to engage the air chute and be secured thereto through a compression fitting and connect the flexible stage to the air chute through another compressing fitting; and
wherein the flexible stage is adjustable relative to the rotational stage to selectively move the hollow interior of the flexible stage between extending along a common axis through the air chute and the rotational stage and not extending along the common axis.

11. A system for delivering air to an aircraft comprising:
a remote air source configured to provide air;
a flexible air hose configured to receive air from the remote air source;
an air chute configured to connect to the aircraft and deliver air to the aircraft;
an adapter connected to the air hose and the air chute, the adapter including:
a first stage having a hollow interior configured to receive air from the air hose directed to the aircraft and an exterior including a coupling configured to engage one of the air chute and the air hose and position the hollow interior of the first stage in communication with a hollow interior of the air chute and the air hose;
a second stage engaged with the first stage and having a hollow interior configured to receive air from the air hose directed to the aircraft and an adjustable exterior configured to adjust a position of the hollow interior of the second stage;
a third stage engaged with one of the first stage and the second stage through a rotational coupling and having a hollow interior configured to receive air from the air hose directed to the aircraft; and
wherein the rotational coupling is configured to allow the air hose to rotate with respect to the air chute.

12. The system of claim 11 wherein the rotational coupling includes a ball-and-socket joint configured to allow at least one of the first stage, second stage, and the third stage to rotate with respect to the air chute.

13. The system of claim 11, wherein the flexible air hose has a first diameter, the air chute has a second diameter, and a ratio of the first diameter to the second diameter is substantially 7:4.

14. A system for delivering air to an aircraft comprising:
a remote air source configured to provide air;
a flexible air hose configured to receive air from the remote air source;
an air chute configured to connect to the aircraft and deliver air to the aircraft;
an adapter connected to the air hose and the air chute, the adapter including:
a first stage having a hollow interior configured to receive air from the air hose directed to the aircraft and an exterior including a coupling configured to engage one of the air chute and the air hose and position the hollow interior of the first stage in communication with a hollow interior of the air chute and the air hose;
a second stage engaged with the first stage and having a hollow interior configured to receive air from the air hose directed to the aircraft and an adjustable exterior configured to adjust a position of the hollow interior of the second stage;
a third stage engaged with one of the first stage and the second stage through a rotational coupling and having a hollow interior configured to receive air from the air hose directed to the aircraft; and
wherein the rotational coupling is configured to allow the air hose to rotate with respect to the air chute at least when torsional loading is applied to the air hose, and the rotational coupling includes a seal configured to restrict air traveling to the aircraft from passing through the rotational coupling.

15. A system for delivering preconditioned (PC) air to an aircraft, the system comprising:
a preconditioned air source configured to provide air;
an air chute having a hollow interior extending along a first axis, the air chute being configured to connect to the aircraft and deliver air to the aircraft;
a flexible air hose configured to receive air from the preconditioned-air source, the air hose extending along a second axis;
an adapter connected to the air hose and the air chute, the adapter including:
a coupling connected to the air chute and having a hollow interior extending coaxially with the hollow interior of the air chute along the first axis;
a flexible fitting having a hollow interior and an adjustable exterior configured to flex and cause the first axis of the air chute and the second axis of the air hose to extend non-coaxially; and
a rotational coupling having a hollow interior extending coaxially with one of the first axis of the air chute and the second axis of the air hose and an exterior configured to permit rotation of one of the air hose and the air chute with respect to the other of the air hose and the air chute about the one of the first axis of the air chute and the second axis of the air hose.

16. The adapter of claim 15 wherein the flexible fitting is configured to be continuously flexible in a plurality of directions away from at least one of the first axis of the air chute and the second axis of the air hose.

17. The adapter of claim 15 wherein the coupling connected to the air chute includes a crown configured to engage a mounting flange of the air chute to connect to the air chute.

18. The adapter of claim 15 wherein the flexible fitting is formed from one of cloth, nylon, rubber, and plastic and is biased by a plurality of ribs extending along the flexible fitting to position the hollow interior of the flexible fitting to extend coaxially with at least one of the first axis and the second axis.

19. A system configured to deliver air to an aircraft comprising:
a remote air source configured to provide air;
a flexible air hose configured to receive air from the remote air source;
an air chute having a hollow interior configured to receive air, the air chute being configured to connect to the aircraft and deliver air to the aircraft;
an adapter connected between the air hose and the air chute, the adapter including:
a first stage having a hollow interior configured to receive air from the air hose and an exterior engaging the air chute and configured to arrange the hollow interior of the first stage to extend along a common axis with the hollow interior of the air chute;
a second stage engaged with the first stage and having an exterior surrounding a hollow interior configured to receive air from the air hose and deliver the air to the first stage;
a first rotational coupling joining the first stage and the second stage such that the first stage is rotatable relative to the second stage about a first axis;
a third stage having an exterior surrounding a hollow interior configured to receive air from the air hose and deliver the air to the second stage; and
a second rotational coupling joining the second stage and the third stage such that the second stage is rotatable relative to the third stage about a second axis, the second axis being non-parallel with the first axis.

20. The adapter system of claim 19 wherein at least one of the first stage, the second stage, and the third stage include a fixed angle formed by the exterior extending away from the common axis.

* * * * *

UNITED STATES PATENT AND TRADEMARK OFFICE
CERTIFICATE OF CORRECTION

| | | |
|---|---|---|
| PATENT NO. | : 8,016,325 B2 | Page 1 of 1 |
| APPLICATION NO. | : 11/753382 | |
| DATED | : September 13, 2011 | |
| INVENTOR(S) | : Gosis et al. | |

It is certified that error appears in the above-identified patent and that said Letters Patent is hereby corrected as shown below:

Claim 1, Column 7, line 18, "tie" should be --the--.

Signed and Sealed this
Eighteenth Day of October, 2011

David J. Kappos
*Director of the United States Patent and Trademark Office*